United States Patent
Niu et al.

(10) Patent No.: US 8,980,136 B2
(45) Date of Patent: Mar. 17, 2015

(54) POLYMERS CONTAINING FUNCTIONALIZED CARBON NANOTUBES

(75) Inventors: Chunming Niu, Lexington, MA (US); Lein Ngaw, Lowell, MA (US)

(73) Assignee: Hyperion Catalysis International, Inc., Cambridge, MA (US)

(*) Notice: Subject to any disclaimer, the term of this patent is extended or adjusted under 35 U.S.C. 154(b) by 1085 days.

(21) Appl. No.: 11/841,760

(22) Filed: Aug. 20, 2007

(65) Prior Publication Data

US 2008/0176983 A1     Jul. 24, 2008

Related U.S. Application Data

(63) Continuation of application No. 11/259,989, filed on Oct. 26, 2005, which is a continuation of application No. 10/282,685, filed on Oct. 29, 2002, now abandoned.

(60) Provisional application No. 60/336,772, filed on Oct. 29, 2001.

(51) Int. Cl.
*H01B 1/24*     (2006.01)
*H01B 1/04*     (2006.01)
(Continued)

(52) U.S. Cl.
CPC .............. *B82Y 30/00* (2013.01); *B82Y 10/00* (2013.01); *B82Y 40/00* (2013.01); *C01B 31/0273* (2013.01); *C08K 7/24* (2013.01); *H01B 1/24* (2013.01)
USPC ........... 252/500; 252/502; 252/510; 252/511; 423/447.1; 423/447.2; 524/495; 524/496

(58) Field of Classification Search
USPC .......... 252/500, 502, 511, 506; 428/357, 398, 428/402, 408; 423/447.1, 447.2, 445 B; 524/495, 496
See application file for complete search history.

(56) References Cited

U.S. PATENT DOCUMENTS

| 4,663,230 A | 5/1987 | Tennent |
| 4,855,091 A | 8/1989 | Geus et al. |

(Continued)

FOREIGN PATENT DOCUMENTS

| JP | 03-287821 | 12/1991 |
| JP | 11502494 T | 2/1999 |

(Continued)

OTHER PUBLICATIONS

International Search Report PCT/US02/34435.
(Continued)

*Primary Examiner* — Stanley Silverman
*Assistant Examiner* — Kallambella Vijayakumar
(74) *Attorney, Agent, or Firm* — Laura L. Lee

(57) ABSTRACT

A polymer composite composed of a polymerized mixture of functionalized carbon nanotubes and monomer which chemically reacts with the functionalized nanotubes. The carbon nanotubes are functionalized by reacting with oxidizing or other chemical media through chemical reactions or physical adsorption. The reacted surface carbons of the nanotubes are further functionalized with chemical moieties that react with the surface carbons and selected monomers. The functionalized nanotubes are first dispersed in an appropriate medium such as water, alcohol or a liquefied monomer and then the mixture is polymerized. The polymerization results in polymer chains of increasing weight bound to the surface carbons of the nanotubes. The composite may consists of some polymer chains imbedded in the composite without attachment to the nanotubes. The resulting composite yields superior chemical, physical and electrical properties over polymer composites that are only physically mixed and without binding to the surface carbons of the nanotubes.

18 Claims, 2 Drawing Sheets

DSC analysis profiles of a fibril(2%)-nylon6 composite and a pure nylon-6 sample.

(51) Int. Cl.
  *C08L 77/00* (2006.01)
  *C08L 75/00* (2006.01)
  *C08L 69/00* (2006.01)
  *B82Y 30/00* (2011.01)
  *B82Y 10/00* (2011.01)
  *B82Y 40/00* (2011.01)
  *C01B 31/02* (2006.01)
  *C08K 7/24* (2006.01)

(56) References Cited

U.S. PATENT DOCUMENTS

| | | | |
|---|---|---|---|
| 5,110,693 | A | 5/1992 | Friend et al. |
| 5,165,909 | A | 11/1992 | Tennent et al. |
| 5,171,560 | A | 12/1992 | Tennent |
| 5,456,897 | A | 10/1995 | Moy et al. |
| 5,500,200 | A | 3/1996 | Mandeville et al. |
| 5,569,635 | A | 10/1996 | Moy et al. |
| 5,611,964 | A | 3/1997 | Friend et al. |
| 5,643,502 | A | 7/1997 | Nahass et al. |
| 5,691,054 | A | 11/1997 | Tennent et al. |
| 5,707,916 | A | 1/1998 | Snyder et al. |
| 5,853,877 | A | 12/1998 | Shibuta |
| 5,877,110 | A | 3/1999 | Snyder et al. |
| 5,965,470 | A | 10/1999 | Bening et al. |
| 5,968,650 | A | 10/1999 | Tennent et al. |
| 6,031,711 | A | 2/2000 | Tennent et al. |
| 6,099,960 | A | 8/2000 | Tennent et al. |
| 6,099,965 | A | 8/2000 | Tennent et al. |
| 6,143,689 | A | 11/2000 | Moy et al. |
| 6,203,814 | B1 | 3/2001 | Fisher et al. |
| 6,205,016 | B1 * | 3/2001 | Niu ............... 361/503 |
| 6,299,812 | B1 | 10/2001 | Newmann et al. |
| 6,331,262 | B1 | 12/2001 | Haddon et al. |
| 6,358,878 | B1 | 3/2002 | Moy et al. |
| 6,426,134 | B1 * | 7/2002 | Lavin et al. ............ 428/300.1 |
| 6,599,961 | B1 * | 7/2003 | Pienkowski et al. ......... 523/120 |
| 6,872,681 | B2 | 3/2005 | Niu et al. |
| 2002/0197474 | A1 * | 12/2002 | Reynolds ............... 428/398 |
| 2004/0202603 | A1 | 10/2004 | Fischer et al. |
| 2008/0102020 | A1 | 5/2008 | Niu et al. |
| 2008/0199387 | A1 | 8/2008 | Bening et al. |

FOREIGN PATENT DOCUMENTS

| | | | |
|---|---|---|---|
| JP | 11263916 A | | 9/1999 |
| JP | 2000-044216 | | 2/2000 |
| JP | 2001-256621 | | 9/2001 |
| WO | 8907163 A1 | | 8/1989 |
| WO | 9105089 A1 | | 4/1991 |
| WO | 9507316 A1 | | 3/1995 |
| WO | 9732571 A1 | | 9/1997 |
| WO | WO 97/32571 | * | 9/1997 ............ A61K 9/00 |
| WO | 0056795 A1 | | 9/2000 |

OTHER PUBLICATIONS

Anderson, G.W., et al., "The Use of Esters of N-Hydroxysuccinimide in Peptide Synthesis," J. Amer. Chem. Soc. 86, 1839-1842 (1964).
Bening and McCarthy, "Surface Chemistry of Fibrillar Carbon," Polymer Preprints ACS Div. of Polymer Chem., 30 (1), p. 420 (1990).
Calvert, P.; "A Recipe for Strength", Nature, vol. 399, pp. 210-211 (1999).
Cotton and Wilkinson, "Advanced Inorganic Chemistry," Wiley-Interscience Publication, New York 1980, p. 76.
Iijima, S., "Helical microtubules of graphitic carbon," Nature 354:56-58 (1991).
Staab, H.A., "Synthesis Using Heterocyclic Amid (Azolides)," Angew. Chem. Internat. Edit., vol. 1(7):351-367 (1962).
Urry, G., "Anomalies in the Behavior of Graphite,"Elementary Equilibrium Chemistry of Carbon, Wiley-Interscience Publication, New York (1989), pp. 25-29.
Weaver, J.H., "Totally Tubular," Science 265, pp. 611-612 (1994).

* cited by examiner

DSC analysis profiles of a fibril(2%)-nylon6 composite and a pure nylon-6 sample.

TGA analysis profiles of a fibril(2%)-nylon6 composite and pure nylon-6 sample.

Initiation

Chain growth by polyaddition

Chain growth by polycondensation

Chain grafting

Reaction scheme: Initiation and chain growth by addition and condensation are known for caprolactam polymerization, chain grafting is believed occurred during this reaction.

POLYMERS CONTAINING FUNCTIONALIZED CARBON NANOTUBES

BACKGROUND OF THE INVENTION

1. Field of the Invention

The present invention broadly relates to polymer composites containing graphitic nanotubes. More specifically, the present invention relates to polymer composites prepared from functionalized nanotubes and a monomer which reacts with functional sites on the nanotubes during in situ polymerization 2. Description of the Related Art The advent of polymer composites containing carbon nanotubes has revolutionized the fields of materials science and materials engineering. These polymer composites are ⅙ the weight of steel but 50 to 100 or more times stronger than steel. As such, these polymer composites have found use in a variety of applications, from capacitors to electroconductive paint to electrodes. The demand for these materials has been great and improvements in their production are widely sought.

Methods of manufacturing composites containing carbon nanotubes begin with monomers that have already been polymerized to form a polymer matrix. Carbon nanotubes are added to the polymer matrix. Such methods and the products obtained are described, for example, in U.S. Pat. No. 5,643,502. U.S. Pat. No. 6,299,812 to Newman et al., describes the use of melt blowing and melt spinning to form composites containing carbon nanotubes. Carbon nanotubes are mixed with polymer pellets and the mixture is heated to a temperature greater than the melting point of the polymer. The liquefied mixture is extruded or spun, and then cooled to form a polymer composite. The carbon nanotubes are physically bonded to the polymer not chemically bonded.

Methods for crosslinking matrices of carbon nanotubes are described in U.S. Pat. No. 6,203,814 and U.S. patent application Ser. No. 08/812,856. The carbon nanotubes are first functionalized, e.g., by oxidation, and then reacted with crosslinking agents to form porous crosslinked nanotube structures having novel properties.

Studies have shown that the incorporation of monolayers of clay into polymer composites improve the properties of the composites, for example, the flexural strength and flexural modulus. The incorporation of clay into polymers also significantly enhances the barrier properties of certain polymers against compounds such as oxygen, nitrogen, carbon dioxide, water vapor, and gasoline. The use of clay in polymers can also increase the heat distortion temperature of the polymer.

OBJECTS OF THE INVENTION

It is an object of this invention to provide a composition that includes carbon nanotubes chemically bonded to a polymer matrix.

It is a further and related object of this invention to provide a composition that includes carbon nanotubes chemically bonded to a polymer matrix which is polymerized in situ.

It is yet another object of this invention to provide a composition that incorporates carbon nanotubes in a polymer matrix wherein the composition has properties superior to those of the polymer matrix alone.

It is still a further and related object of this invention to provide methods for synthesizing compositions that include carbon nanotubes chemically bonded to a polymer matrix.

It is still a further and related object of this invention to provide methods of forming compositions that include carbon nanotubes chemically bonded to a polymer matrix wherein the polymerization is conducted after the carbon nanotubes are chemically bonded to monomers of the polymer matrix.

SUMMARY OF THE INVENTION

The present invention is in compositions that includes carbon nanotubes that have been chemically bonded to polymer chains. The compositions of the present invention feature polymer matrices. The polymers of the matrices are formed from in situ polymerization. As a result, a monomer of the polymer is first chemically bonded to the surface of a carbon nanotube. After chemical bonding, polymerization allows polymer chains to form from the monomer. In other words, the polymer chains increase in molecular weight. The resulting compositions have chemical, physical and electrical properties over compositions that contain carbon nanotubes physically mixed in a polymer matrix without any chemical bonding.

The present invention also provides methods of making these compositions that contain carbon nanotubes chemically bonded to polymer chains.

Other improvements which the present invention provides over the prior art will be identified as a result of the following description which sets forth the preferred embodiments of the present invention. The description is not in any way intended to limit the scope of the present invention, but rather only to provide a working example of the present preferred embodiments. The scope of the present invention will be pointed out in the appended claims.

BRIEF DESCRIPTION OF THE DRAWINGS

The accompanying drawings, which are incorporated in and constitute a part of the specification, illustrate an exemplary embodiment of the present invention.

DETAILED DESCRIPTION OF THE INVENTION

Figure 1:
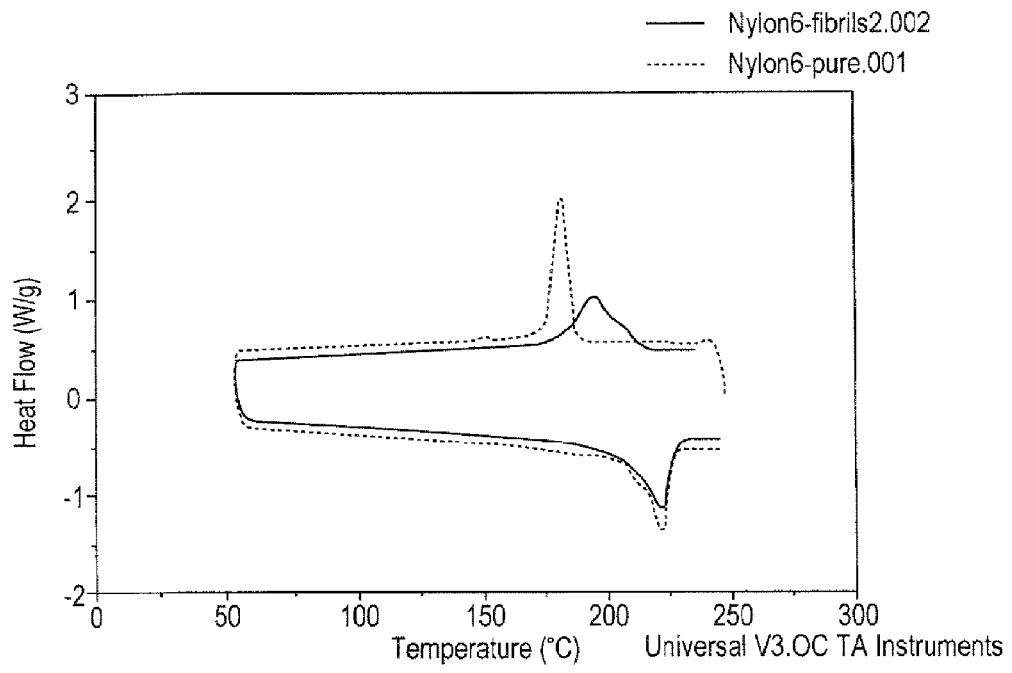
FIG. 1 depicts DSC analysis profiles of a pure nylon-6 sample vs. a composite made in accordance with an embodiment of the present invention.

Patents, patent applications, and patent publications referred to herein are incorporated by reference in their entirety.

Definitions

"Aggregate" refers to a microscopic particulate structures of nanotubes. More specifically, the term "assemblage" refers to nanotube structures having relatively or substantially uniform physical properties along at least one dimensional axis and desirably having relatively or substantially uniform physical properties in one or more planes within the assemblage, i.e. having isotropic physical properties in that plane. The assemblage may comprise uniformly dispersed individual interconnected nanotubes or a mass of connected aggregates of nanotubes. In other embodiments, the entire assemblage is relatively or substantially isotropic with respect to one or more of its physical properties.

"Functionalized nanotubes" refers to carbon nanotubes whose surfaces are uniformly or non-uniformly modified so as to have a functional chemical moiety associated therewith. These surfaces are functionalized by reaction with oxidizing or other chemical media through chemical reactions or physical adsorption. Functionalized nanotubes can then be further modified by additional reactions to form other functional moieties on the surfaces of the carbon nanotubes. By changing the chemical moieties on the surfaces of the carbon nanotube, the functionalized carbon nanotubes can be physically or chemically bonded to a wide variety of substrates. Methods of making and using functionalized nanotubes are disclosed in U.S. Pat. No. 6,203,814 to Fisher et al. and pending application U.S. Ser. No. 08/812,856 filed Mar. 6, 1997, of which are both incorporated by reference in their entirety.

"Graphenic" carbon is a form of carbon whose carbon atoms are each linked to three other carbon atoms in an essentially planar layer forming hexagonal fused rings. The layers are platelets having only a few rings in their diameter or ribbons having many rings in their length but only a few rings in their width.

"Graphenic analogue" refers to a structure which is incorporated in a graphenic surface.

"Graphitic" carbon consists of layers which are essentially parallel to one another and no more than 3.6 angstroms apart.

"Internal structure" refers to the internal structure of an assemblage including the relative orientation of the fibers, the diversity of and overall average of nanotube orientations, the proximity of the nanotubes to one another, the void space or pores created by the interstices and spaces between the fibers and size, shape, number and orientation of the flow channels or paths formed by the connection of the void spaces and/or pores. According to another embodiment, the structure may also include characteristics relating to the size, spacing and orientation of aggregate particles that form the assemblage. The term "relative orientation" refers to the orientation of an individual nanotube or aggregate with respect to the others (i.e., aligned versus non-aligned). The "diversity of" and "overall average" of nanotube or aggregate orientations refers to the range of nanotube orientations within the structure (alignment and orientation with respect to the external surface of the structure).

"Isotropic" means that all measurements of a physical property within a plane or volume of the structure, independent of the direction of the measurement, are of a constant value. It is understood that measurements of such non-solid compositions must be taken on a representative sample of the structure so that the average value of the void spaces is taken into account.

"Macropore" refers to a pore which has a diameter of greater than or equal to 50 nm.

"Mesopore" refers to a pore which has a diameter of greater than or equal to 2 nm but less than 50 nm.

"Micropore" refers to a pore which has a diameter of less than 2 nm.

"Nanotube", "nanofiber" and "fibril" are used interchangeably. Each refers to an elongated hollow structure having a diameter less than 1 µm. The term "nanotube" also includes "bucky tubes" and graphitic nanofibers in which the graphene planes are oriented in herring bone pattern.

"Non-uniform pore structure" refers to a pore structure occurring when individual discrete nanotubes are distributed in a substantially non-uniform manner with substantially non-uniform spacings between nanotubes.

"Property" means an inherent, measurable property that can include physical, chemical or mechanical properties, e.g., surface area, resistivity, fluid flow characteristics, density, porosity, melting point, heat distortion, modulus, flexural strength etc.

"Relatively" means that 95% of the values of the physical property when measured along an axis of, or within a plane of or within a volume of the structure, as the case may be, will be within plus or minus 20% of a mean value.

"Substantially" or "predominantly" mean that 95% of the values of the property when measured along an axis of, or within a plane of or within a volume of the structure, as the case may be, will be within plus or minus 10% of a mean value.

"Surface area" refers to the total surface area of a substance measurable by the BET technique as known in the art, a physisorption technique. Nitrogen or helium can be use absorbents to measure the surface area.

"Uniform pore structure" refers to a pore structure occurring when individual discrete nanotubes or nanofibers form the structure. In these cases, the distribution of individual nanotubes in the particles is substantially uniform with substantially regular spacings between the nanotubes. These spacings vary according to the densities of the structures.

Carbon Nanotubes

The term nanotubes refers to carbon tubes or fibers having very small diameters including fibrils, whiskers, buckytubes, etc. Such structures provide significant surface area when assembled into a structure because of their size and shape. Such nanotubes can be made with high purity and uniformity.

Preferably, the nanotubes used in the present invention have a diameter less than 1 µm, preferably less than about 0.5 µm, and even more preferably less than 0.1 µm and most preferably less than 0.05 µm.

The nanotubes, buckytubes, fibrils and whiskers that are referred to in this application are distinguishable from continuous carbon fibers commercially available as reinforcement materials. In contrast to nanofibers, which have desirably large, but unavoidably finite aspect ratios, continuous carbon fibers have aspect ratios (L/D) of at least $10^4$ and often $10^6$ or more. The diameter of continuous fibers is also far larger than that of fibrils, being always greater than 1 µm and typically 5 to 7 µm.

Carbon nanotubes exist in a variety of forms and have been prepared through the catalytic decomposition of various carbon-containing gases at metal surfaces. U.S. Pat. No. 4,663,230 to Tennent hereby incorporated by reference, describes carbon nanotubes that are free of a continuous thermal carbon overcoat and have multiple ordered graphitic outer layers that are substantially parallel to the nanotube axis. As such they may be characterized as having their c-axes, the axes which are perpendicular to the tangents of the curved layers of graphite, substantially perpendicular to their cylindrical axes. They generally have diameters no greater than 0.1 µm and length to diameter ratios of at least 5. Desirably they are substantially free of a continuous thermal carbon overcoat, i.e., pyrolytically deposited carbon resulting from thermal cracking of the gas feed used to prepare them. Tennent describes nanotubes typically 3.5 to 70 nm having an ordered, "as grown" graphitic surface.

U.S. Pat. No. 5,171,560 to Tennent et al., hereby incorporated by reference, describes carbon nanotubes free of thermal overcoat and having graphitic layers substantially parallel to the nanotube axes such that the projection of the layers on the nanotube axes extends for a distance of at least two nanotube diameters. Typically, such nanotubes are substantially cylindrical, graphitic nanotubes of substantially constant diameter and comprise cylindrical graphitic sheets whose c-axes are substantially perpendicular to their cylindrical axis. They are substantially free of pyrolytically deposited carbon, have a diameter less than 0.1 µm and a length to diameter ratio of greater than 5. These fibrils are of primary interest in the invention.

When the projection of the graphitic layers on the nanotube axis extends for a distance of less than two nanotube diameters, the carbon planes of the graphitic nanotube, in cross section, take on a herring bone appearance. These are termed fishbone fibrils. U.S. Pat. No. 4,855,091 to Geus, hereby incorporated by reference, provides a procedure for preparation of fishbone fibrils substantially free of a pyrolytic overcoat. These carbon nanotubes are also useful in the practice of the invention. See also, U.S. Pat. No. 5,165,909 to Tennent, hereby incorporated by reference.

Oxidized nanofibers are used to form rigid porous assemblages. U.S. Pat. No. 5,965,470, hereby incorporated by reference, describes processes for oxidizing the surface of carbon nanotubes that include contacting the nanotubes with an oxidizing agent that includes sulfuric acid ($H_2SO_4$) and potassium chlorate ($KClO_3$) under reaction conditions (e.g., time, temperature, and pressure) sufficient to oxidize the surface of the fibril. The nanotubes oxidized according to the processes of McCarthy, et al. are non-uniformly oxidized, that is, the carbon atoms are substituted with a mixture of carboxyl, aldehyde, ketone, phenolic and other carbonyl groups. Nanotubes have also been oxidized non-uniformly by treatment with nitric acid. International Application WO95/07316 discloses the formation of oxidized fibrils containing a mixture of functional groups.

In published work, McCarthy and Bening (Polymer Preprints ACS Div. of Polymer Chem. 30 (1)420(1990)) prepared derivatives of oxidized nanotubes in order to demonstrate that the surface comprised a variety of oxidized groups. The compounds they prepared, phenylhydrazones, haloaromaticesters, thallous salts, etc., were selected because of their analytical utility, being, for example, brightly colored, or exhibiting some other strong and easily identified and differentiated signal.

Nanotubes may be oxidized using hydrogen peroxide, chlorate, nitric acid and other suitable reagents. See, for example, U.S. patent application Ser. No. 09/861,370 filed May 18, 2001 entitled "Modification of Carbon Nanotubes by Oxidation with Peroxygen Compounds" and U.S. patent application Ser. No. 09/358,745, filed Jul. 21, 1999, entitled "Methods of Oxidizing Multiwalled Carbon Nanotubes." These applications are hereby incorporated by reference.

Carbon nanotubes of a morphology similar to the catalytically grown fibrils or nanotubes described above have been grown in a high temperature carbon arc (Iijima, Nature 354 56 1991, hereby incorporated by reference). It is now generally accepted (Weaver, Science 265 1994, hereby incorporated by reference) that these arc-grown nanofibers have the same morphology as the earlier catalytically grown fibrils of Tennent. Arc grown carbon nanofibers are also useful in the invention.

Nanotube Aggregates and Assemblages

The "unbonded" precursor nanotubes may be in the form of discrete nanotubes, aggregates of nanotubes or both. As with all nanoparticles, nanotubes aggregate in several stages or degrees. Catalytically grown nanotubes produced according to U.S. Pat. No. 6,031,711 are formed in aggregates substantially all of which will pass through a 700 µm sieve. About 50% by weight of the aggregates pass through a 300 µm sieve. The size of as-made aggregates can be reduced by various means.

These aggregates have various morphologies (as determined by scanning electron microscopy) in which they are randomly entangled with each other to form entangled balls of nanotubes resembling bird nests ("BN"); or as aggregates consisting of bundles of straight to slightly bent or kinked carbon nanotubes having substantially the same relative orientation, and having the appearance of combed yarn ("CY")—e.g., the longitudinal axis of each nanotube (despite individual bends or kinks) extends in the same direction as that of the surrounding nanotubes in the bundles; or, as, aggregates consisting of straight to slightly bent or kinked nanotubes which are loosely entangled with each other to form an "open net" ("ON") structure. In open net structures the extent of nanotube entanglement is greater than observed in the combed yarn aggregates (in which the individual nanotubes have substantially the same relative orientation) but less than that of bird nest. CY and ON aggregates are more readily dispersed than BN.

When carbon nanotubes are used, the aggregates, when present, are generally of the bird's nest, combed yarn or open net morphologies. The more "entangled" the aggregates are, the more processing will be required to achieve a suitable composition if a high porosity is desired. This means that the selection of combed yarn or open net aggregates is most preferable for the majority of applications. However, bird's nest aggregates will generally suffice.

The morphology of the aggregate is controlled by the choice of catalyst support. Spherical supports grow nanotubes in all directions leading to the formation of bird nest aggregates. Combed yarn and open net aggregates are prepared using supports having one or more readily cleavable planar surfaces. U.S. Pat. No. 6,143,689 hereby incorporated by reference, describes nanotubes prepared as aggregates having various morphologies.

Further details regarding the formation of carbon nanotube or nanofiber aggregates may be found in the disclosures of U.S. Pat. No. 5,165,909; U.S. Pat. No. 5,456,897; U.S. Pat. No. 5,707,916; U.S. Pat. No. 5,877,110; PCT Application No. US89/00322, filed Jan. 28, 1989 ("Carbon Fibrils") WO 89/07163, and Moy et al., U.S. Pat. No. 5,110,693, U.S. patent application Ser. No. 447,501 filed May 23, 1995; U.S. patent application Ser. No. 456,659 filed Jun. 2, 1995; PCT Application No. US90/05498, filed Sep. 27, 1990 ("Fibril Aggregates and Method of Making Same") WO 91/05089, and U.S. Pat. No. 5,500,200; U.S. application Ser. No. 08/329,774 by Bening et al., filed Oct. 27, 1984; and U.S. Pat. No. 5,569,635, all of which are assigned to the same assignee as the invention here and of which are hereby incorporated by reference.

Nanotube mats or assemblages have been prepared by dispersing nanofibers in aqueous or organic media and then filtering the nanofibers to form a mat or assemblage. The mats have also been prepared by forming a gel or paste of nanotubes in a fluid, e.g. an organic solvent such as propane and then heating the gel or paste to a temperature above the critical temperature of the medium, removing the supercritical fluid and finally removing the resultant porous mat or plug from the vessel in which the process has been carried out. See, U.S. Pat. No. 5,691,054.

Functionalized Nanotubes

Functionalized nanotubes useful in the methods of the invention to produce the compositions of the invention may refer to compositions which broadly have the following formula(e):

wherein n is an integer, L is a number less than 0.1 n, m is a number less than 0.5 n, each of R is the same and is selected from SO₃H, COOH, NH₂, OH, R'CHOH, CHO, CN, COCl, halide, COSH, SH, COOR', SR', SiR'₃,

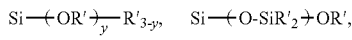

R", Li, AlR'₂, Hg—X, TlZ₂ and Mg—X, y is an integer equal to or less than 3,

R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate.

The carbon atoms, $C_n$, are surface carbons of a substantially cylindrical, graphitic nanotube of substantially constant diameter. The nanotubes include those having a length to diameter ratio of greater than 5 and a diameter of less than 0.5μ preferably less than 0.1μ. The nanotubes can also be substantially cylindrical, graphitic nanotubes which are substantially free of pyrolytically deposited carbon, more preferably those characterized by having a projection of the graphite layers on the fibril axis which extends for a distance of at least two fibril diameters and/or those having cylindrical graphitic sheets whose c-axes are substantially perpendicular to their cylindrical axis. These compositions are uniform in that each of R is the same.

Non-uniformly substituted nanotubes are also useful. These include compositions of the formula

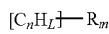

where n, L, m, R and the nanotube itself are as defined above, provided that each of R does not contain oxygen, or, if each of R is an oxygen-containing group COOH is not present.

Functionalized nanotubes having the formula

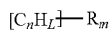

where n, L, m, R and R' have the same meaning as above and the carbon atoms are surface carbon atoms of a fishbone fibril having a length to diameter ratio greater than 5, may also be used included within the invention. These may be uniformly or non-uniformly substituted. Preferably, the nanotubes are free of thermal overcoat and have diameters less than 0.5μ.

Also useful in the methods of invention to produce the compositions of the invention are functionalized nanotubes having the formula

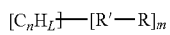

where n, L, m, R' and R have the same meaning as above. The carbon atoms, $C_n$, are surface carbons of a substantially cylindrical, graphitic nanotube of substantially constant diameter, as described above.

In both uniformly and non-uniformly substituted nanotubes, the surface atoms $C_n$ are reacted. Most carbon atoms in the surface layer of a graphitic fibril, as in graphite, are basal plane carbons. Basal plane carbons are relatively inert to chemical attack. At defect sites, where, for example, the graphitic plane fails to extend fully around the fibril, there are carbon atoms analogous to the edge carbon atoms of a graphite plane (See Urry, *Elementary Equilibrium Chemistry of Carbon*, Wiley, New York 1989.) for a discussion of edge and basal plane carbons).

At defect sites, edge or basal plane carbons of lower, interior layers of the nanotube may be exposed. The term surface carbon includes all the carbons, basal plane and edge, of the outermost layer of the nanotube, as well as carbons, both basal plane and/or edge, of lower layers that may be exposed at defect sites of the outermost layer. The edge carbons are reactive and must contain some heteroatom or group to satisfy carbon valency.

The substituted nanotubes described above may advantageously be further functionalized. Such compositions include compositions of the formula

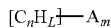

where the carbons are surface carbons of a nanotube, n, L and m are as described above, A is selected from OY, NHY, O═C—OY, P═C—NR'Y, O═C—SY, O═C—Y, —CR'1-OY, N'Y or C'Y, Y is an appropriate functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—NR'₂, R'SH, R'CHO, R'CN, R'X, R'N⁺(R')₃X⁻, R'SiR'₃, R'Si—( OR'—)ᵧR'₃₋ᵧ,

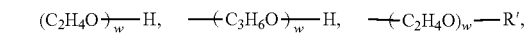

(C₃H₆O)ᵥᵥ)—R', R', and w is an integer greater than one and less than 200.

The carbon atoms, $C_n$, are surface carbons of a substantially cylindrical, graphitic nanotube of substantially constant diameter as described above.

The functional nanotubes of structure

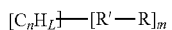

may also be functionalized to produce compositions having the formula

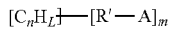

where n, L, m, R' and A are as defined above. The carbon atoms, $C_n$, are surface carbons of a substantially cylindrical, graphitic nanotube of substantially constant diameter as described above.

The compositions of the invention also include nanotubes upon which certain cyclic compounds are adsorbed. These include compositions of matter of the formula

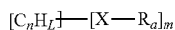

where n is an integer, L is a number less than 0.1 n, m is less than 0.5 n, a is zero or a number less than 10, X is a polynuclear aromatic, polyheteronuclear aromatic or metallopolyheteronuclear aromatic moiety and R is as recited above. The carbon atoms, $C_n$, are surface carbons of a substantially cylindrical, graphitic nanotube of substantially constant diameter. The nanotubes include those having a length to diameter ratio of greater than 5 and a diameter of less than 0.5μ, preferably less than 0.1μ. The nanotubes can also be substantially cylindrical, graphitic nanotubes which are substantially free of pyrolytically deposited carbon and more preferably those characterized by having a projection of the graphite layers on said fibril axes which extend for a distance of at least two fibril diameters and/or those having cylindrical graphitic sheets whose c-axes are substantially perpendicular to their cylindrical axes. Preferably, the nanotubes are free of thermal overcoat and have diameters less than 0.5μ.

Preferred cyclic compounds are planar macrocycles as described on p. 76 of Cotton and Wilkinson, *Advanced Organic Chemistry*. More preferred cyclic compounds for adsorption are porphyrins and phthalocyanines.

The adsorbed cyclic compounds may be functionalized. Such compositions include compounds of the formula

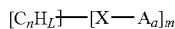

where m, n, L, a, X and A are as defined above and the carbons are surface carbons of a substantially cylindrical graphitic nanotube as described above.

Methods of Functionalizing Carbon Nanotubes

The functionalized carbon nanotubes used to prepare the nanotube-polymer, matrices of the invention can be directly prepared by sulfonation, electrophilic addition to deoxygenated carbon nanotube surfaces or metallation. The carbon nanotubes can be processed prior to contacting them a functionalizing agent. Such processing may include dispersing the nanotubes in a solvent. In some instances the carbon nanotubes may then be filtered and dried prior to contact. Specific examples of methods of functionalizing carbon nanotubes can be found in U.S. Pat. No. 5,203,814 to Fisher et al and pending U.S. application Ser. No. 08/812,856 filed Mar. 6, 1997, both hereby incorporated by reference.

One particularly useful type of functionalized carbon nanotubes are those that have been functionalized with carboxylic acid moieties. These nanotubes can be prepared, for example, from chlorate, nitric acid, or ammonium persulfate oxidation.

Carboxylic acid functionalized carbon nanotubes are particularly useful because they can serve as the starting point for preparing other types of functionalized carbon nanotubes. For example, alcohols or amides can be easily linked to the acid to give stable esters or amides. If the alcohol or amine is part of a di- or poly-functional molecule, then linkage through the O— or NH— leaves the other functionalities as pendant groups. These reactions can be carried out using any of the methods developed for esterifying or aminating carboxylic acids with alcohols or amines as known in the art. Examples of these methods can be found in H. A. Staab, Angew. Chem. Internat. Edit., (1), 351 (1962) and G. W. Anderson, et al., J. Amer. Chem. Soc. 96, 1839 (1965) which are hereby both incorporated by reference in their entirety. Amino groups can be introduced directly onto graphitic nanotubes by treating the nanotubes with nitric acid and sulfuric acid to get nitrated fibrils, then reducing the nitrated form with a reducing agent such as sodium dithionite to get amino-functionalized fibrils.

Polymer Composites Containing Carbon Nanotubes

Any of the above disclosed functionalized carbon nanotubes can be used to produce polymer composites of carbon nanotubes wherein the polymer chains are chemically bonded to the carbon nanotubes. The choice of a functionalized carbon nanotube depends on the type of polymer that is to be used for the composite.

Examples of polymers which can be used to form the matrices include, but are not limited to, those selected from the polycarbonates, polyamides, polyesters and polyurethanes and mixtures or combinations thereof. Specific examples of polymers include, but are not limited to, the polyamide of adipic acid and hexamethylene diamine (nylon 6,6); poly(6-aminohexanoic acid) (nylon-6); the polyamide of meta-phthalic acid and meta-diaminobenzene (Nomex), the polyamide of para-phthalic acid and para-diaminobenzene (Kevlar), the polyester of dimethyl terephthalate and ethylene glycol (Dacron); the polycarbonate of carbonic acid; the polycarbonate of diethyl carbonate and bisphenol A (Lexan); the polyurethane of carbamic acid; the polyurethane of isocyanate and alcohol; the polyurethane of phenyl isocyanate with ethanol; the polyurethane of toluene diisocyanate and ethylene glycol. Any other condensation polymers would also be suitable for the present invention. They can also be organic/inorganic hybrid based.

Certain monomers are more readily bonded to certain functionalized carbon nanotubes than other functionalized carbon nanotubes. The choice of which type of functionalized nanotube to be used will be apparent to one skilled in the art.

Preparation of the Composites

To prepare the composites, functionalized nanotubes are first dispersed into a vehicle. The vehicle depends on the type of monomer that will be used to form the composite. For example, the vehicle can be water, an alcohol (e.g., ethylene glycol) or other liquid known in the art. Alternatively, the vehicle can be the liquefied monomer, as a single phase or an emulsion. The dispersion can be implemented by the use of ultrasonic sonicators or sonifiers or by mechanical means e.g. a homogenizer, blender or mixer. The dispersion is carried out before the polymerization of the monomers.

Monomers are reacted to chemically bond to the functional moieties on the functionalized nanotubes. For example, the monomer ε-caprolactam serves as the building block for nylon-6. ε-caprolactam has an amine group at one end and a carboxylic acid group at the other end. Upon heating, the monomer hydrolyzes to the free amino acid, The free amino acid chemically bonds to an acid site on the carbon nanotube and polymers. A single carbon nanotube may have multiple polymer chains attached to it. The molecular weight of the polymer increases as the process continues. Techniques used to polymerize monomers are known to those skilled in the art.

For example, in the case of nylon-6, continued heating of the monomers causes them to polymerize.

Composites of the Invention

The composites at the invention may have multiple polymer chains attached to each carbon nanotube. The composites are predominantly may comprise of polymer and has a continuous polymer phase.

The carbon nanotube content of the composite is from about 0.25% to about 20% by weight of the composite. Preferably the nanotubes comprise less than 10% by weight, and more preferably less than 6% by weight of the composite. The polymer composites are solid and free of pores. For example, the polymer composites are 99.5% solid.

EXAMPLES

Example 1

Preparation of Carboxylic Acid-Functionalized Fibrils Using Chlorate

A sample of CC carbon nanotubes was slurried in concentrated $H_2SO_4$ by mixing with a spatula and then transferred to a reactor flask fitted with gas inlet/outlets and an overhead stirrer. With stirring and under a slow flow of argon, the charge of $NaClO_3$ was added in portions at room temperature over the duration of the run. Chlorine vapors were generated during the entire course of the run and were swept out of the reactor into a aqueous NaOH trap. At the end of the run, the fibril slurry was poured over cracked ice and vacuum filtered. The filter cake was then transferred to a Soxhlet thimble and washed in a Soxhlet extractor with deionized water, exchanging fresh water every several hours. Washing was continued until a sample of the carbon nanotubes, when added to fresh deionized water, did not change the pH of the water. The carbon nanotubes were then separated by filtration and dried at 100° C. at 5" vacuum overnight.

Example 2

Preparation of Carboxylic Acid-Functionalized Fibrils Using Nitric Acid

A sample of carbon nanotubes was slurried with nitric acid of the appropriate strength in a bound bottom multi-neck indented reactor flask equipped with an overhead stirrer and a water condenser. With constant stirring, the temperature was adjusted and the reaction carried out for the specified time. Brown fumes were liberated shortly after the temperature exceeded 70° C., regardless of acid strength. After the reaction, the slurry was poured onto cracked ice and diluted with deionized water. The slurry was filtered and excess acid removed by washing in a Soxhlet extractor, replacing the reservoir with fresh deionized water every several hours, until a slurried sample gave no change in pH from deionized water. The carbon nanotubes were dried at 100° C. at 5" vacuum overnight.

Example 3

Preparation of Amino-Functionalized Fibrils Using Nitric Acid

To a cooled suspension (0° C.) of fibrils (70 mg) in water (1.6 ml) and acetic acid (0.8 ml) was added nitric acid (0.4 ml) in a dropwise manner. The reaction mixture was stirred for 15 minutes at 0° C. and stirred for further 1 hour at room temperature. A mixture of sulfuric acid (0.4 ml) and hydrochloric acid (0.4 ml) was added slowly and stirred for 1 hour at room temperature. The reaction was stopped and centrifuged. The aqueous layer was removed and the fibrils washed with water (×5). The residue was treated with 10% sodium hydroxide (×3), and washed with water (×5) to furnish nitrated fibrils.

To a suspension of nitrated fibrils in water (3 ml) and ammonium hydroxide (2 ml) was added sodium dithionite (200 mg) in three portions at 0° C. The reaction mixture was stirred for 5 minutes at room temperature and refluxed for 1 hour at 100° C. The reaction was stopped, cooled to 0° C. and the pH adjusted with acetic acid (pH 4). After standing overnight at room temperature, the suspension was filtered, washed with water (×10), methanol (×5) and dried under vacuum to give amino fibrils.

Example 4

Preparation of Ester/Alcohol Derivatives from Carboxylic Acid

The carboxylic acid functionalized carbon nanotubes were prepared as in Example 1. The carboxylic acid content was 0.75 meq/g. Carbon nanotubes were reacted with a stoichiometric amount of CDI in an inert atmosphere with toluene as solvent at room temperature. until $CO_2$ evolution ceased. Thereafter, the slurry was reacted at 80° C. with a 10-fold molar excess of polyethyleneglycol (MW 600) and a small amount of NaOEt as catalyst. After two hours reaction, the carbon nanotubes were separated by filtration, washed with toluene and dried at 100° C.

Example 5

Preparation of Amide/Amine Derivatives from Carboxylic Acid-Functionalized Fibrils 0.242 g of chlorate-oxidized fibrils (0.62 meq/g) was suspended in 20 ml anhydrous dioxane with stirring in a 100 ml RB flask fitted with a serum stopper. A 20-fold molar excess of N-hydroxysuccinimide (0.299 g) was added and allowed to dissolve. This was followed by addition of 20-fold molar excess of 1-ethyl-3-(3-dimethylaminopropyl)carbodiimide (EDAC) (0.510 g), and stirring was continued for 2 hr at RT. At the end of this period stirring was stopped, and the supernatant aspirated and the solids were washed with anhydrous dioxane and MeOH and filtered on a 0.45 micron polysulfone membrane. The solids were washed with additional MeOH on the filter membrane and vacuum-dried until no further weight reduction was observed. Yield of NHS-activated oxidized fibrils was 100% based on the 6% weight gain observed.

100 µl ethylenediamine was added to 10 ml 0.2 M $NaHCO_3$ buffer. An equivalent volume of acetic acid (HOAc) was added to maintain the pH near 8. NHS-activated oxidized fibrils (0.310 g) was added with vigorous stirring and reacted for 1 hr. An additional 300 µl of ethylenediamine and 300 µl HOAc was added for an additional 10 min. The solution was filtered on 0.45 micron polysulfone membrane and washed successively with $NaHCO_3$ buffer, 1% HCl, DI water and EtOH. The solids were dried under vacuum overnight.

Example 6

Preparation of Fibril-Nylon-6 Composite

A solution of ε-caprolactam (99+%), commercially available from Sigma-Aldrich, was diluted with water to from a mixture of ε-caprolactam and water in a ratio of 30:1.5 at a temperature of about 60° C. on a hot plate. Once a clear solution is formed, drops of polymerization catalyst either acetic acid or $H_3PO_4$ was added (two drops per 31.5 g solution).

Once the solution was prepared, the functionalized carbon nanotubes were dispersed in the ε-caprolactam solution. Both ammonium persulfate and nitric acid oxidized fibrils were used. The dispersion of the fibrils was carried out prior to the polymerization. About 3 g ε-caprolactam solution was transferred to a test tube with an outer diameter of about 16 mm. After an appropriate amount of oxidized fibril particles was added, the tube was placed in a hot water bath (~60° C.) for a few hours to allow the fibril particles to expand. Final dispersion was obtained by ultrasonication with a 3 mm diameter tipped probe for 3 minutes. After the dispersion, the polymerization occurred. The reactor consisted of a one-inch outer diameter steel tube with one end capped and the other connected to a fine needle valve used to slowly release water vapor, a tube furnace in a vertical orientation, and a temperature programmed controller. The glass test tube was immediately placed in the steel reactor. The reactor was capped and any air trapped in the reactor was exchanged with argon, then the reactor was placed in a furnace. The polymerization was carried out by heating the reactor at 180° C. for an initial period of 30 minutes. This was followed by an increase of temperature to 260° C. for another thirty minutes. Subsequently, the needle valve on the top of reactor was opened and water vapor was bled in a period of 1.5 hr at the same temperature. The composite was obtained by breaking the glass tube after the reactor was cooled down to room temperature. The composite was heated in hot water to remove any remaining monomer residue which was less than 5%.

Digital scanning calorimetry (DSC) analysis was carried out to study the effect of the chemically bonded fibrils on the melting and recrystallization properties of nylon-6. The DSC analysis was carried out with a sample size of about 10 mg under an argon flow of 50 cc/min and at a temperature up and down rate of 10° C./minute. Cold argon from an automatic controlled electric chiller was sent to the sample cell to ensure a 10° C. down rate. The results are summarized in Table 1 below.

TABLE 1

| DSC analysis results | | | | | | |
|---|---|---|---|---|---|---|
| | Melting | | | Recrystallization | | |
| Sample | T1 (° C.) | T2 (° C.) | ΔH (J/g) | T1 (° C.) | T2 (° C.) | ΔH (J/g) |
| Pure Nylon-6 | 214 | 222.3 | 65.4 | 181.5 | | 68.7 |
| Nylon-6-fibrils | | 222.6 | 74.4 | 195.4 | 207.7 | 74.5 |

FIG. 1 shows DSC analysis profiles recorded from a composite with 2% fibrils and a pure nylon-6 sample. The melting temperatures, recrystallization temperatures, and heat of the fusion of both samples are summarized in Table 1. It can be seen that the pure nylon sample showed a two melting peaks at 214 and 222.3° C. and only one recrystallization temperature at 181.5° C. The composite sample with 2% fibrils showed one melting temperature at 222.6° C., which is essentially the same as the second melting peak, 222.3° C. of the composite sample, and two recrystallization peaks at 195.4° C. and 207° C. Both peak temperatures are 14° C. greater than that of the pure nylon-6 sample. A 13% increase in the heat of the fusion suggests that the presence of fibrils in the composite increased the crystallinity of the nylon-6.

Thermal gravimetric analysis (TGA) analysis was carried out to study the effect of fibrils on the thermal stability of nylon-6. The TGA analysis was carried out with a sample size of about 10 mg under an argon flow at a temperature rate of 5° C./min.

Figure 2:
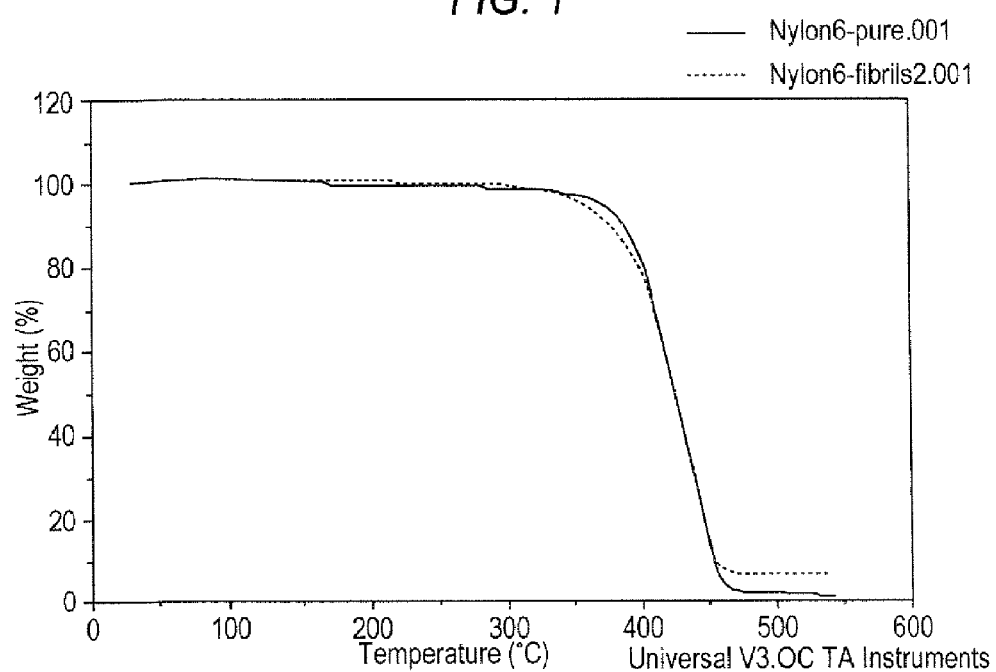
FIG. 2 depicts TGA analysis profiles of a pure nylon-6 sample vs. a composite made in accordance with an embodiment of the present invention.
Figure 3:
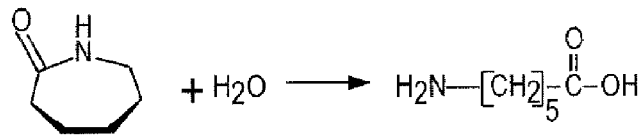
FIG. 3 depicts the polymer chain growth in the caprolactam polymerization reaction.
Figure 3:
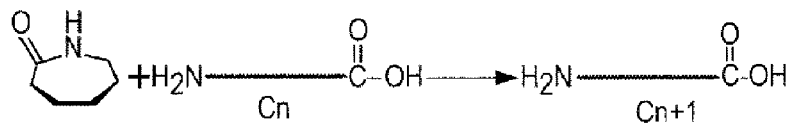
Figure 3:
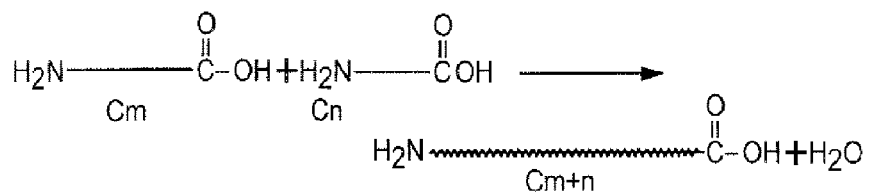
Figure 3:
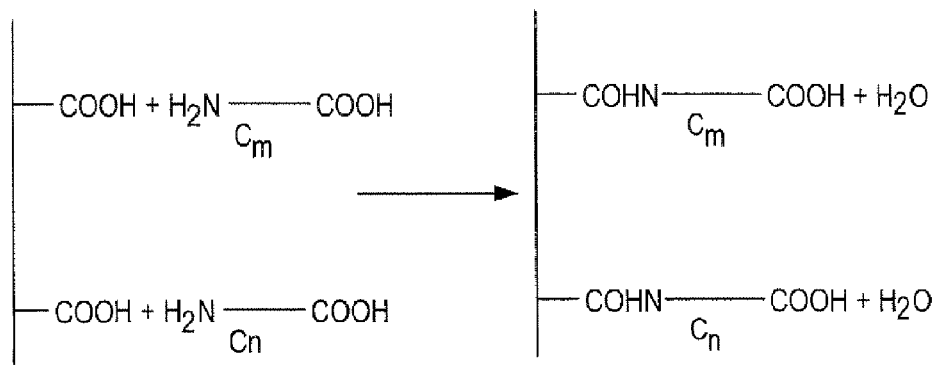

FIG. 2 shows the TGA analysis profiles recorded from the composite with 2% fibrils plotted against a pure nylon-6 sample. It can be seen that the overall thermal profiles of the two samples are almost the same, except that the 2% fibril composite has a slightly lower decomposition temperature and a higher percentage of residue.

In addition to changes in the melting and recrystallization temperatures, a change in peak tensile strength was also seen. A peak tensile strength of 12,000 psi was measured from the composite sample with 2% fibrils, whereas the peak tensile strength for the pure sample was 8,000 psi. The peak tensile strength was measured by using a homemade tensile tester formed for hot-pressed thin sheet samples.

Example 7

Preparation Fibril-PET Composite

Thirty gm of ethylene glycol, 0.6 g of oxidized fibrils and 0.01 g of antimony trioxide are added to a 100 cc beaker. The fibrils are dispersed in the mixture by ultrasonication for three minutes in combination with a 450 W ultrasound homogenizer.

In a glass test tube, 1.5 g dimethyl terephthalate and 1.5 g of the fibril dispersion mixture are added. The glass tube is transferred to a reactor disclosed in Example 6 and the air in the reactor is purged with argon. Then the reactor is sealed by closing a needle valve, placed in a furnace, and is heated at about 220° C. for an initial period of thirty minutes followed by an additional 30 minutes at 280° C. to polymerize the monomers. The valve on the reactor is gradually opened to allow the water, methanol and excess ethylene glycol to evaporate over a period of 90 minutes. Then the reactor is evacuated at 280° C. for 30 min. Finally, the reactor is cooled down to room temperature and a fibril-PET composite with about 1% fibrils is obtained.

Example 8

Preparation of Fibril-Polycarbonate Composite

In a glass test tube, 1.5 g bisphenol A, 1.5 g dimethyl carbonate and 0.030 g oxidized fibril is added. The tube is heated to 160° C. to melt the monomer. The mixture is sonicated to disperse the fibrils in the monomer liquid at 160° C. Following the addition of 15 μL 6% LiOH.H2O solution by injection, the tube is immediately placed in a steel reactor disclosed in Example 6, and air in the reactor is purged with argon. Then the reactor is sealed by closing a needle valve, placed in a furnace, heated to 180° C. for a period of 60 minutes, followed by heating to 190° C. for a period of 60 minutes and then heating to 230° C. for a period of 30 minutes. The reactor is then evacuated at 230° C. for 30 min and 165° C. for 120 min. Finally, the composite is cooled to room temperature, the reactor is opened and a fibril-poly(bisphenol A carbonate) composite with about 1% fibrils is obtained.

The terms and expressions which have been employed are used as terms of description and not of limitations, and there is no intention in the use of such terms or expressions of excluding any equivalents of the features shown and described as portions thereof, its being recognized that various modifications are possible within the scope of the invention.

Broadly, the monomer used is bifunctional, as it has terminal (or intermediate) groups, e.g. acid, amino or alcohol groups, which bond to a reactive moiety on the functionalized nanotube. An example is caprolactam (ε-aminocaproic acid) which has amine moieties which could react with carboxylic acid moieties on the functionalized nanotubes and carboxylic acid moieties which could react with amine moieties on the functionalized nanotubes.

In one embodiment of the invention the monomer of choice, (e.g. caprolactam) is intimately mixed with functionalized nanotubes containing carboxylic acid moieties. The mixture is caused to polymerize. Polymer chains are formed. Some of such chains react at their amino termini with carboxylic acid moieties on the nanotubes to form an amide. Other chains may extend outwardly from the amide formed by reaction of a monomer with the carboxylic acid group.

The composition formed is a fully dense nylon matrix containing nanotubes bound within the polymer.

In another embodiment, caprolactam can be reacted with nanotubes containing amine moieties to form a similar composition.

In still another embodiment, a mixture of carboxylic acid and amine functionalized nanotubes can be used. The product thus formed may have polymer chains linked at the carboxyl termini to an amine group on the nanotubes and linked at the amine termini to a carboxyl group on the nanotubes.

We claim:

1. A method for preparing a polymer composite containing carbon nanotubes comprising the steps of:
   functionalizing multiwalled carbon nanotubes by chemically reacting surface carbon including basal plane layers of the multiwalled carbon nanotubes with functional groups;
   dispersing the functionalized multiwalled carbon nanotubes in an appropriate vehicle, wherein said functionalized carbon nanotubes comprise reacted basal plane surface carbon atoms;
   adding a selected monomer reactive with sites on said functionalized nanotubes to the dispersion, wherein said monomer comprises a monomer of polycarbonates, polyamides, polyesters, polyurethanes or mixtures thereof; and
   causing said monomer to polymerize, and react with or form a functional group on said functionalized nanotubes to form said composite.

2. The method of claim 1, wherein the functionalizing occurs by chemically reacting edge and basal plane carbons, which are exposed by defect sites on the multiwalled carbon nanotubes, with functionalizing monomers.

3. The method of claim 1, wherein the dispersing occurs in an appropriate vehicle of water, alcohol, or a liquefied monomer.

4. The method of claim 1, wherein the functionalizing of the multiwalled carbon nanotubes by chemically reacting surface carbon comprises chemically reacting the multiwalled carbon nanotubes with a functional group with the formula $[C_nH_L]$—$R_m$
   where C is a surface carbon atom,
   n is a positive integer,
   L is a number less than 0.1 n,
   m is a number less than 0.5 n,
   each of R is selected from the group consisting of $SO_3H$, COOH, $NH_2$, OH, R'CHOH, CHO, CN, COCl, halide, COSH, SH, COOR', SR', $SiR'_3$, $Si(OR')_yR'_{3-y}$, $Si(O$—$SiR'_2)OR'$, R", Li, $AlR'_2$, Hg—X, $TlZ_2$ and Mg—X,
   where y is an integer equal to or less than 3,
   where R' is hydrogen, alkyl, aryl, cycloalkyl, or aralkyl, cycloaryl, or poly(alkylether),
   R" is fluoroalkyl, fluoroaryl, fluorocycloalkyl, fluoroaralkyl or cycloaryl,
   X is halide, and
   Z is carboxylate or trifluoroacetate.

5. The method of claim 1, wherein:
   the adding of the selected monomer comprises adding a bifunctional monomer comprising a first moiety and a second moiety different from the first moiety and the functionalized carbon nanotubes comprise more than one reactive moiety; and wherein:
   the causing said monomer to polymerize and react with said functionalized nanotubes comprises polymerizing the first moiety to a reactive moiety on the functionalized carbon nanotubes and at the second moiety to a reactive moiety on the functionalized carbon nanotubes.

6. The method of claim 1, where said forming of said composite comprises forming a composite with more than two polymer chains attached to each functionalized carbon nanotube.

7. The method of claim 1, wherein said functionalizing multiwalled carbon nanotubes comprises chemically reacting surface carbon including basal plane layers of the multiwalled carbon with a functional group, wherein the functional group is selected from the group consisting of a monomer of a polycarbonate, a porphyrin, a phthalocyanine, and a mixture containing a monomer of a polycarbonate, a porphyrin, or a phthalocyanine.

8. The method of claim 1, where said functionalizing the multiwalled carbon nanotubes comprises functionalizing multiwalled carbon nanotubes in the form of aggregates or mats.

9. The method of claim 1, where said functionalizing the multiwalled carbon nanotubes comprises functionalizing multiwalled carbon nanotubes in the form of fishbone fibrils.

10. The method of claim 1, where said functionalizing the multiwalled carbon nanotubes comprises functionalizing multiwalled carbon nanotubes with a protein, a peptide, an amino acid, an enzyme, an antibody, a nucleotide, an oligonucleotide, an antigen, or an enzyme substrate, an enzyme inhibitor, or a transition state analog of an enzyme substrate.

11. A method for preparing a polymer composite containing carbon nanotubes comprising the steps of:
   providing a plurality of multiwalled carbon nanotubes;
   functionalizing more than one of the plurality of multiwalled carbon nanotubes by chemically reacting surface carbon including a basal plane layer of the more than one of the plurality of multiwalled carbon nanotubes with functional groups to form functionalized multiwalled carbon nanotubes;
   dispersing the functionalized multiwalled carbon nanotubes in an appropriate vehicle, wherein the functionalized multiwalled carbon nanotubes comprise the formula $[C_nH_L]$—$R_m$
   where C is a surface carbon atom,
   n is a positive integer,
   L is a number less than 0.1 n,
   m is a number less than 0.5 n,
   each of R is selected from the group consisting of $SO_3H$, COOH, $NH_2$, OH, R'CHOH, CHO, CN, COCl, halide, COSH, SH, COOR', SR', $SiR'_3$, $Si(OR')_yR'_{3-y}$, $Si(O-SiR'_2)OR'$, R", Li, $AlR'_2$, Hg—X, $TlZ_2$ and Mg—X, where y is an integer equal to or less than 3, where R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate, and where the functionalized carbon nanotubes comprise reacted basal plane surface carbon atoms;

adding a selected monomer reactive with sites on said functionalized nanotubes to the dispersion; and causing said monomer to polymerize, and react with or form a functional group on said functionalized nanotubes to form said composite, wherein said adding of the selected monomer comprises adding a monomer selected from the group consisting of a monomer used to form polymers including polycarbonates, polyamides, polyesters and polyurethanes and mixtures or combinations thereof.

12. The method of claim 11, wherein the functionalizing occurs by chemically reacting edge and basal plane carbons, which are exposed by defect sites on the multiwalled carbon nanotubes, with functionalizing monomers.

13. The method of claim 11, wherein the dispersing occurs in an appropriate vehicle of water, alcohol, or a liquefied monomer.

14. The method of claim 11, where said forming of said composite comprises forming a composite with more than two polymer chains attached to each functionalized carbon nanotube.

15. The method of claim 11, where said functionalizing the multiwalled carbon nanotubes comprises functionalizing multiwalled carbon nanotubes in the form of aggregates or mats.

16. The method of claim 11, where said functionalizing the multiwalled carbon nanotubes comprises functionalizing multiwalled carbon nanotubes in the form of fishbone fibrils.

17. The method of claim 11, where said functionalizing the multiwalled carbon nanotubes comprises functionalizing multiwalled carbon nanotubes with a protein, a peptide, an amino acid, an enzyme, an antibody, a nucleotide, an oligonucleotide, an antigen, or an enzyme substrate, an enzyme inhibitor, or a transition state analog of an enzyme substrate.

18. A method for preparing a polymer composite containing carbon nanotubes comprising the steps of:

providing a plurality of multiwalled carbon nanotubes;

functionalizing more than one of the plurality of multiwalled carbon nanotubes by chemically reacting surface carbon including a basal plane layer of the more than one of the plurality of multiwalled carbon nanotubes with functional groups to form functionalized multiwalled carbon nanotubes;

dispersing the functionalized multiwalled carbon nanotubes in an appropriate vehicle, wherein the functionalized multiwalled carbon nanotubes comprise the formula $[C_nH_L]-R_m$ where C is a surface carbon atom, n is a positive integer, L is a number less than 0.1 n, m is a number less than 0.5 n, each of R is selected from the group consisting of $SO_3H$, COOH, $NH_2$, OH, R'CHOH, CHO, CN, COCl, halide, COSH, SH, COOR', SR', $SiR'_3$, $Si(OR')_yR'_{3-y}$, $Si(O-SiR'_2)OR'$, R", Li, $AlR'_2$, Hg—X, $TlZ_2$ and Mg—X, where y is an integer equal to or less than 3, where R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate, and where the functionalized carbon nanotubes comprise reacted basal plane surface carbon atoms;

adding a selected monomer reactive with sites on said functionalized nanotubes to the dispersion; and causing said monomer to polymerize, and react with or form a functional group on said functionalized nanotubes to form said composite, wherein:

the adding of the selected monomer comprises adding a bifunctional monomer comprising a first moiety and a second moiety different from the first moiety and the functionalized carbon nanotubes comprise more than one reactive moiety; and wherein the causing said monomer to polymerize and react with said functionalized nanotubes comprises polymerizing at the first moiety to a reactive moiety on the functionalized carbon nanotubes and at the second moiety to a reactive moiety on the functionalized carbon nanotubes.

* * * * *